United States Patent
Akita et al.

(10) Patent No.: US 8,334,680 B2
(45) Date of Patent: Dec. 18, 2012

(54) FIELD WINDING TYPE GENERATOR-MOTOR

(75) Inventors: Kenichi Akita, Chiyoda-ku (JP); Kenji Nakajima, Chiyoda-ku (JP); Masato Mori, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 644 days.

(21) Appl. No.: 12/619,320

(22) Filed: Nov. 16, 2009

(65) Prior Publication Data

US 2010/0301816 A1   Dec. 2, 2010

(30) Foreign Application Priority Data

May 26, 2009   (JP) .................................. 2009-126108

(51) Int. Cl.
*H02P 9/10* (2006.01)
(52) U.S. Cl. .......................................... 322/59; 322/44
(58) Field of Classification Search .................... 322/25, 322/28, 44, 59
See application file for complete search history.

(56) References Cited

U.S. PATENT DOCUMENTS

| 5,198,744 | A | 3/1993 | Kohl et al. |
| 7,538,523 | B2 * | 5/2009 | Kitamura et al. ............... 322/33 |
| 7,911,188 | B2 * | 3/2011 | Wada et al. ..................... 322/44 |
| 7,973,517 | B2 * | 7/2011 | Nakajima et al. ............... 322/24 |

FOREIGN PATENT DOCUMENTS

| JP | 53-070316 A1 | 6/1978 |
| JP | 60-51421 A | 3/1985 |
| JP | 4-229100 A | 8/1992 |
| JP | 8-9567 A | 1/1996 |
| JP | 08-098598 A | 4/1996 |
| JP | 10-164898 A | 6/1998 |
| JP | 2005-237084 A | 9/2005 |

* cited by examiner

*Primary Examiner* — Nicholas Ponomarenko
(74) *Attorney, Agent, or Firm* — Sughrue Mion, PLLC

(57) ABSTRACT

Provided is a field winding type generator-motor capable of minimizing cost increase and structure modification while preventing a failure due to a temperature rise, without mounting a temperature sensor. The field winding type generator-motor according to the present invention includes: a dynamo-electric machine that has a field winding; a field current detecting section for detecting field current; a field current restriction deciding section for deciding whether or not the decision value has reached a predetermined decision threshold value by calculating a decision value based on the field current detected by the field current detecting section; and a field current controller for controlling the field current flowing in the field winding so that the field current is restricted to a predetermined permissible value in a case where the field current restriction deciding section decides that the decision value has reached the predetermined decision threshold value.

6 Claims, 8 Drawing Sheets

FIELD WINDING TYPE GENERATOR-MOTOR

BACKGROUND OF THE INVENTION

1. Field of the Invention

The present invention relates to a field winding type generator-motor which is mounted mainly on a vehicle, and operates as a motor upon starting of an engine and also as a generator after the starting of the engine.

2. Description of the Related Art

In general, a generator-motor for vehicle is installed in an engine room. Therefore, the operating temperature of the generator-motor for vehicle becomes extremely high. In addition, the inner temperature of the generator-motor for vehicle becomes further higher due to heat generated when the generator-motor for vehicle operates as a generator or a motor. Therefore, when temperature of the generator-motor for vehicle rises excessively because of continuous operation for long hours or other reason, the generator-motor for vehicle may be out of order because of a breakdown of an internal component or other reason.

Therefore, conventionally, there has been proposed a generator-motor for vehicle, in which, in order to prevent a failure in the generator-motor for vehicle due to a temperature rise, the temperature of the generator-motor for vehicle is measured, and when the measured temperature exceeds a predetermined temperature, field current is restricted to suppress production of electricity so that a thermal load is reduced (see, for example, Japanese Patent Application Laid-Open No. 08-9567).

The conventional technique, however, has the following problems.

In the conventional technique, field current is restricted based on temperature information of the generator-motor for vehicle, which requires a temperature sensor for sensing the temperature to be provided. Therefore, there arises a problem in that cost increase and structure modification of the generator-motor for vehicle may be caused by mounting the temperature sensor.

In addition, in the conventional technique, when the temperature sensor cannot be mounted on the generator-motor for vehicle, the field current cannot be restricted based on a temperature rise of the generator-motor for vehicle. Therefore, there is a problem that production of electricity from the generator for vehicle cannot be controlled, and that a failure in the generator-motor for vehicle due to the temperature rise cannot be prevented.

SUMMARY OF THE INVENTION

The present invention has been made in order to solve the above-mentioned problems, and it is an object of the invention to provide a field winding type generator-motor capable of minimizing cost increase and structure modification while preventing a failure due to a temperature rise, without mounting a temperature sensor.

A field winding type generator-motor according to the present invention includes: a dynamo-electric machine which has a field winding and operates as a generator-motor; a field current detecting section for detecting field current flowing in the field winding; a field current restriction deciding section for deciding whether or not the decision value has reached a predetermined decision threshold value by calculating a decision value based on the field current detected by the field current detecting section; and a field current controller for controlling the field current flowing in the field winding so that the field current is restricted to a predetermined permissible value in a case where the field current restriction deciding section decides that the decision value has reached the predetermined decision threshold value.

According to the field winding type generator-motor of the present invention, field current is restricted based on a detection result of the field current flowing in the field winding so that temperature of the field winding type generator-motor does not rise excessively. Thus, it is possible to obtain the field winding type generator-motor capable of minimizing cost increase and structure modification while preventing a failure due to a temperature rise, without mounting a temperature sensor.

DETAILED DESCRIPTION OF THE PREFERRED EMBODIMENTS

Hereinafter, embodiments of the present invention are described with reference to the accompanying drawings.

Embodiment 1.

Figure 1:
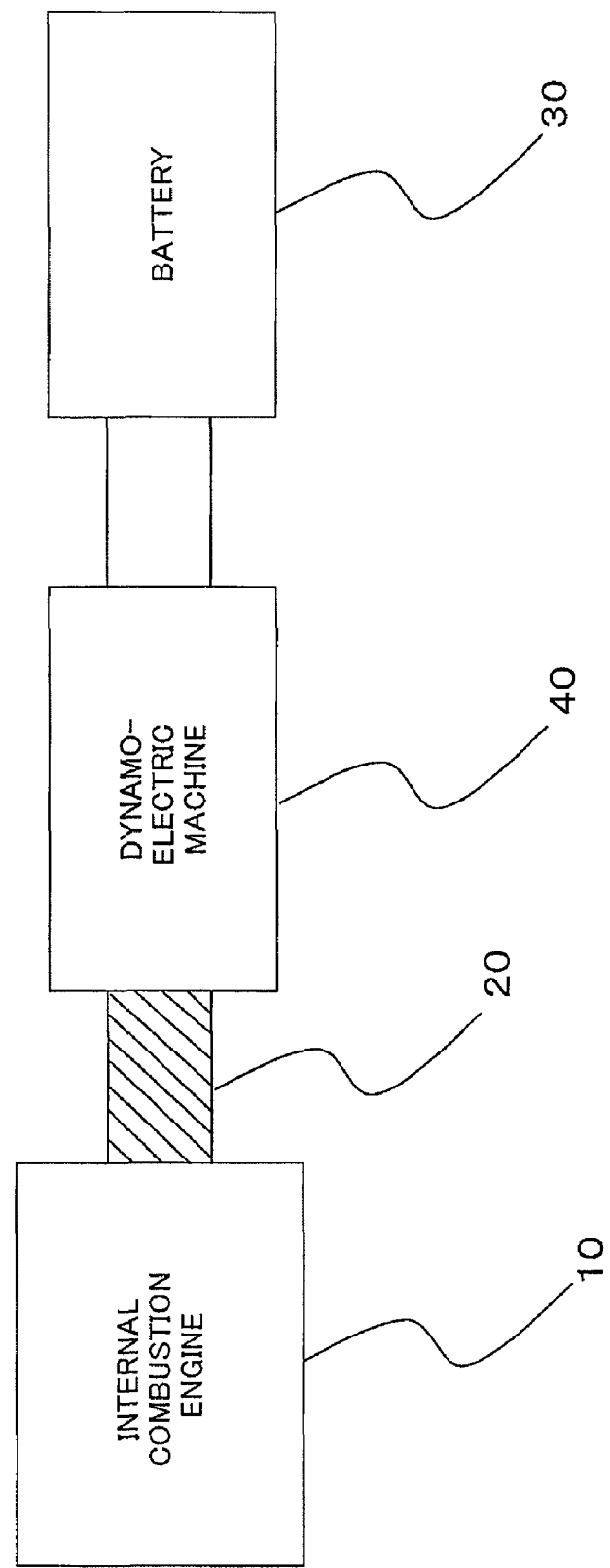
FIG. 1 is a block diagram of a case where a field winding type generator-motor according to Embodiment 1 of the present invention is mounted on a vehicle.

FIG. 1 is a block diagram of a case where a field winding type generator-motor according to Embodiment 1 of the present invention is mounted on a vehicle. The field winding type generator-motor of FIG. 1 is equipped with an internal combustion engine 10, a coupling means 20, a battery 30, and a dynamo-electric machine 40.

The internal combustion engine 10 and the dynamo-electric machine 40 are coupled to each other via the coupling means 20. The battery 30 and the dynamo-electric machine 40 are electrically connected to each other. Here, examples of the coupling means 20 include a belt and a pulley.

Note that the internal combustion engine 10 and the dynamo-electric machine 40 are coupled via the coupling means 20 in Embodiment 1 of the present invention, however, the structure is not limited thereto, and the internal combustion engine 10 and the dynamo-electric machine 40 maybe directly coupled to each other.

In addition, the internal combustion engine 10 is not limited to a gasoline engine or a diesel engine.

Further, the battery 30 may be configured for dedicated use with the dynamo-electric machine 40 or may be shared by the dynamo-electric machine 40 and other loads for vehicle.

Figure 2:
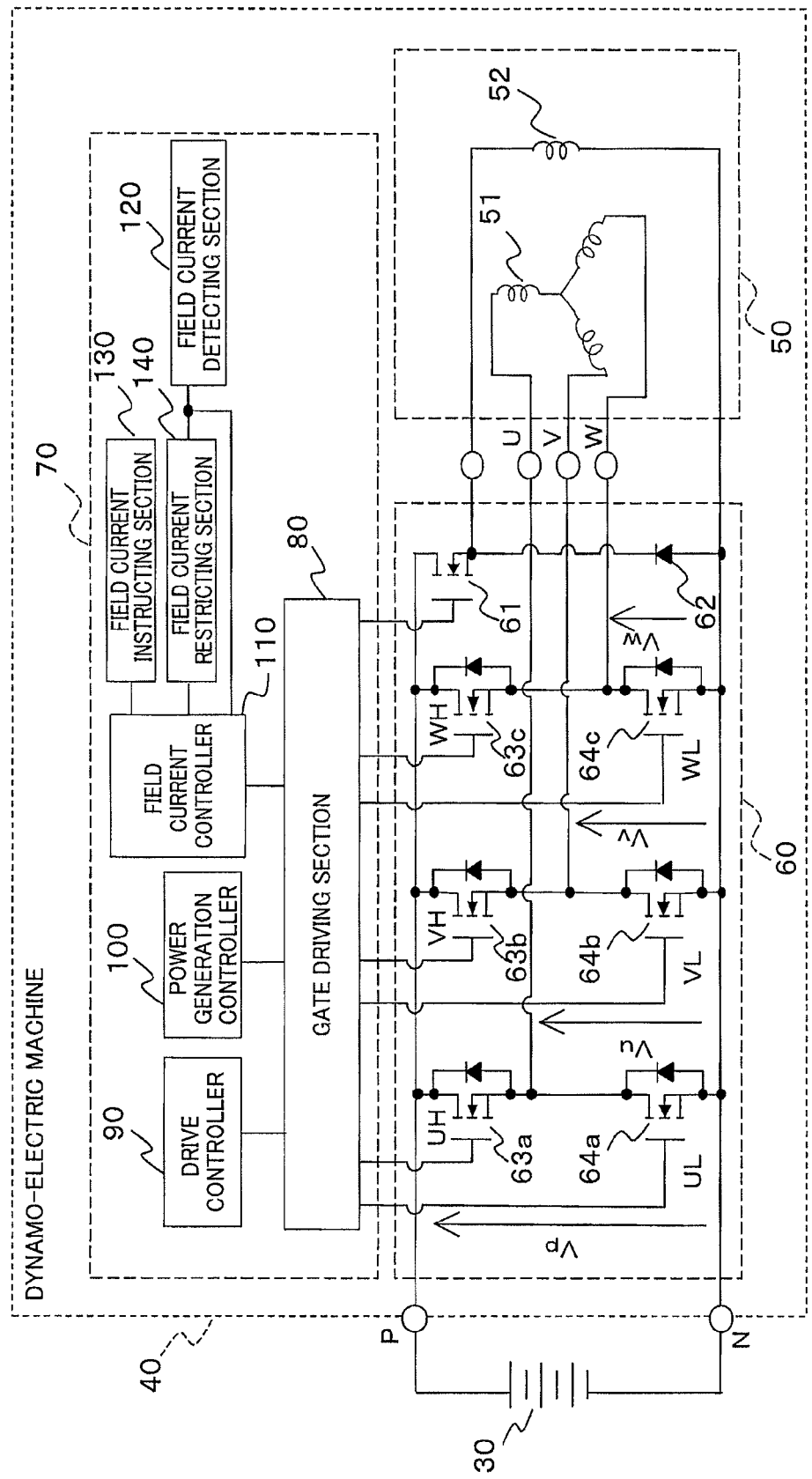
FIG. 2 is an internal block diagram of the dynamo-electric machine illustrated in FIG. 1.

FIG. 2 is an internal block diagram of the dynamo-electric machine 40 illustrated in FIG. 1. The dynamo-electric machine 40 includes a motor-generator section 50, an electric power converter section 60 and a controller 70.

The motor-generator section 50 has an armature winding 51 of a three-phase Y-connection (triangular connection) and a field winding 52. Note that the motor-generator section 50 may use another type of the armature winding 51 other than the three-phase type.

The electric power converter section 60 of a three-phase inverter includes a switching device for field winding current 61 which is connected to the field winding 52, a flywheel diode 62, and switching devices for converting electric power 63a to 63c and 64a to 64c, each of which is connected to each phase of the armature winding 51.

The controller 70 includes a gate driving section 80, a drive controller 90, a power generation controller 100, a field current controller 110, a field current detecting section 120, a field current instructing section 130, and a field current restricting section 140.

The gate driving section 80 drives the switching device for field winding current 61 and the switching devices for converting electric power 63a to 63c and 64a to 64c, based on ON/OFF instructions sent from the drive controller 90, the power generation controller 100, and the field current controller 110, with respect to the armature winding 51 and the field winding 52, to thereby control the drive and the power generation of the motor-generator section 50.

The drive controller 90 controls ON/OFF timings of the switching devices for converting electric power 63a to 63c and 64a to 64c when driving the dynamo-electric machine 40.

The power generation controller 100 controls ON/OFF timings of the switching devices for converting electric power 63a to 63c and 64a to 64c, when performing synchronous rectification upon power generation in the dynamo-electric machine 40.

The field current detecting section 120 detects field current I flowing in the field winding 52. The field current instructing section 130 sends a field current value as a control target value (hereinafter referred to as "field current instruction value $I_f$") to the field current controller 110.

The field current restricting section 140 sends, with respect to the field current controller 110, a field current value for restricting the field current I (hereinafter referred to as "field current restriction value $T_{lim}$"), in a case where the operation in which the field current I is equal to or larger than a predetermined threshold value (hereinafter referred to as "field current threshold value $I_{th}$") is performed continuously for a predetermined time (hereinafter referred to as "continuous operation permitted time $T_{th}$").

Here, when the field current controller 110 receives the field current restriction value $I_{lim}$, from the field current restricting section 140, the field current controller 110 controls the field current I to be supplied to the field winding 52 based on the field current restriction value $I_{lim}$. On the contrary, in the case where the field current controller 110 does not receive the field current restriction value $I_{lim}$, from the field current restricting section 140, the field current controller 110 controls the field current I to be supplied to the field winding 52 based only on the field current instruction value $I_f$.

Figure 3:
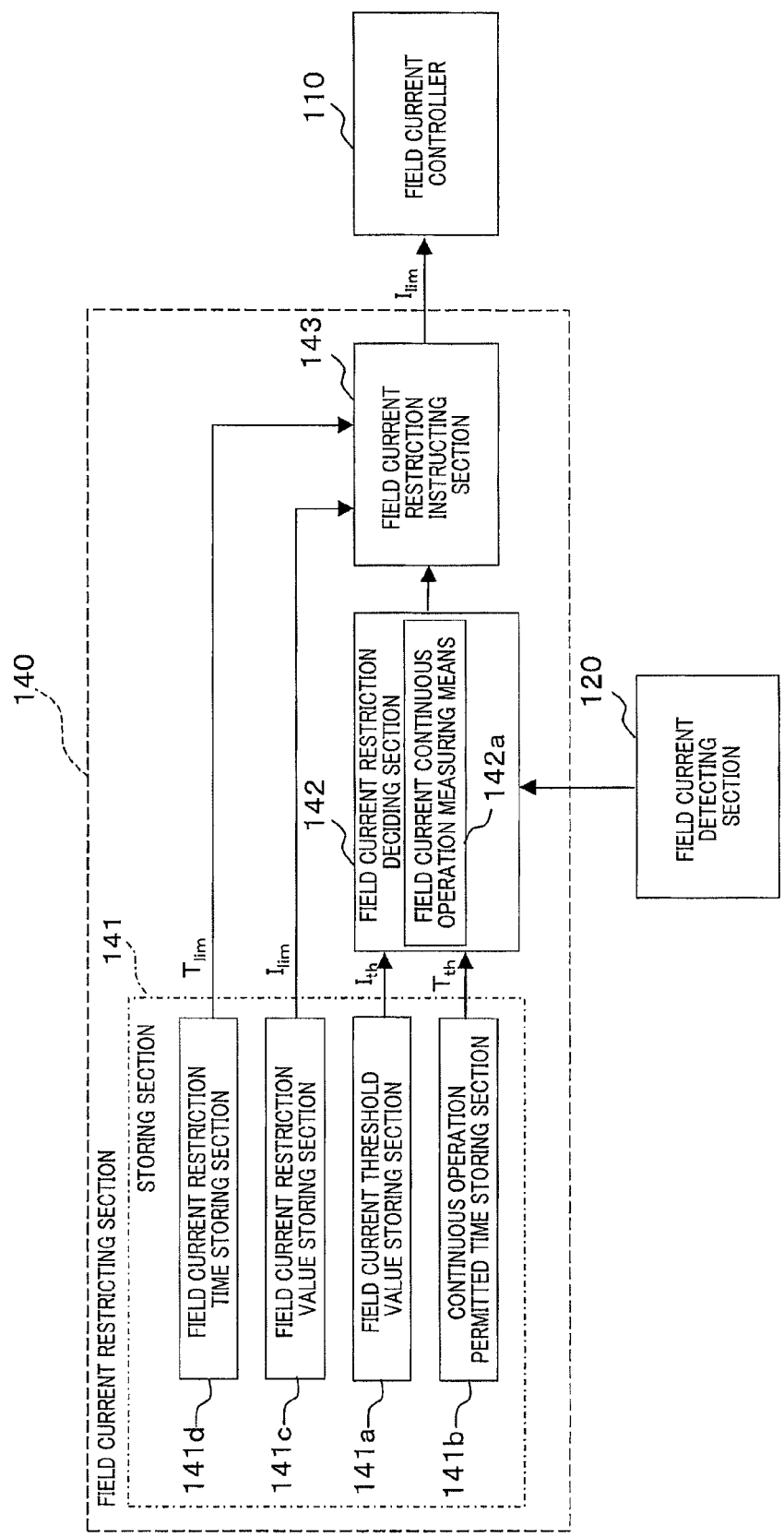
FIG. 3 is an internal block diagram of a field current restricting section illustrated in FIG. 2.

FIG. 3 is an internal block diagram of the field current restricting section 140 illustrated in FIG. 2. The field current restricting section 140 includes a storing section 141, a field current restriction deciding section 142, and a field current restriction instructing section 143.

The storing section 141 includes a field current threshold value storing section 141a, a continuous operation permitted time storing section 141b, a field current restriction value storing section 141c, and a field current restriction time storing section 141d.

The field current restriction value storing section 141a stores in advance a field current threshold value $I_{th}$. The continuous operation permitted time storing section 141b stores in advance continuous operation permitted time $T_{th}$).

The field current restriction value storing section 141c stores in advance a field current restriction value $I_{lim}$. The field current restriction time storing section 141d stores in advance time for performing restriction on the field current I (hereinafter referred to as "field current restriction time $T_{lim}$").

The field current restriction deciding section 142 includes a field current continuous operation measuring means 142a. The field current continuous operation measuring means 142a measures continuous operation time of the field current I when the field current I exceeds the field current threshold value $I_{th}$. In addition, the field current restriction deciding section 142 decides, based on the field current I, the field current threshold value $I_{th}$, and the continuous operation permitted time $T_{th}$ whether or not the restriction on the field current I is necessary.

The field current restriction instructing section 143 sends the field current restriction value $I_{lim}$, to the field current controller 110 in a case where the field current restriction deciding section 142 decides that the restriction on the field current I is necessary.

Figure 4:
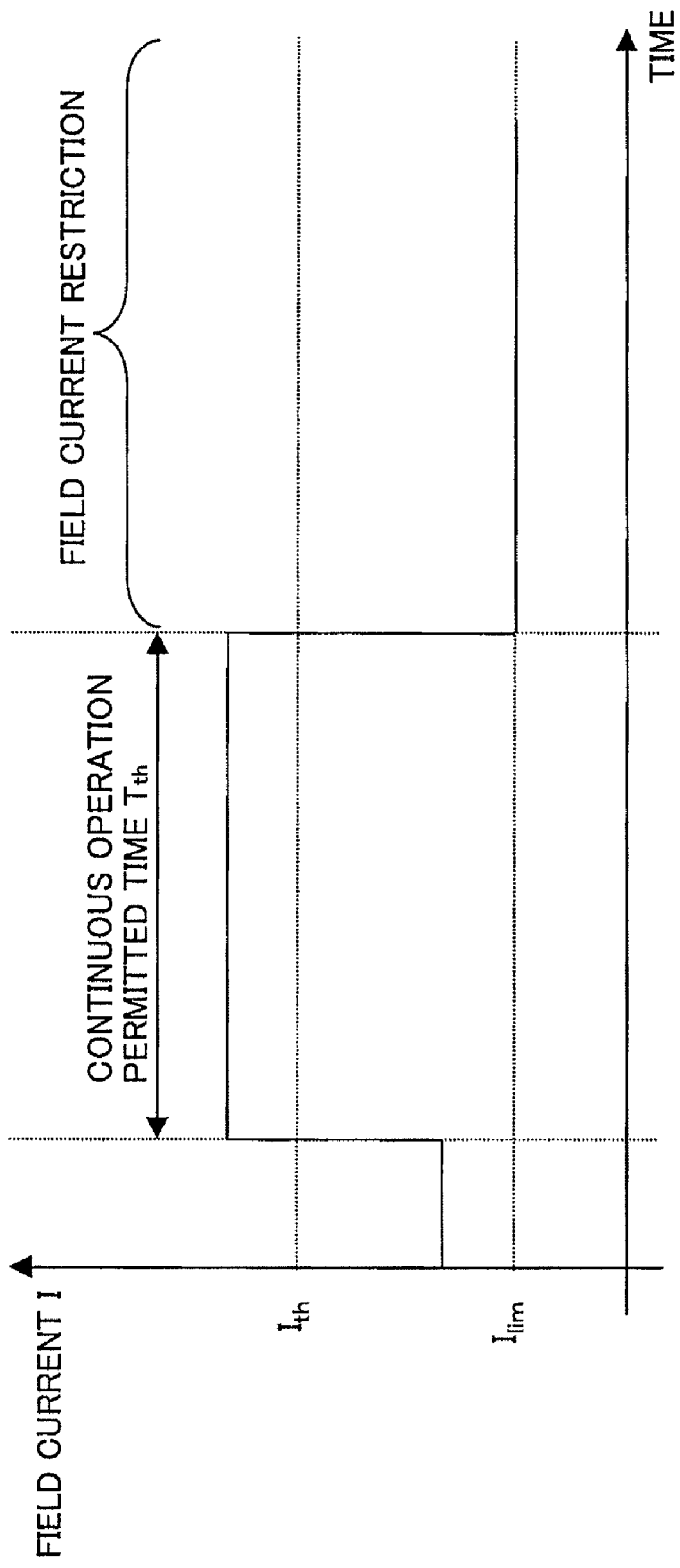
FIG. 4 is an explanatory diagram illustrating a method of deciding whether or not restriction on field current is necessary according to Embodiment 1 of the present invention.

Next, operations of the field current restriction deciding section 142 and the field current restriction instructing section 143 are described as follows with reference to FIG. 4.

First, the field current restriction deciding section 142 compares the field current I detected by the field current detecting section 120, with the field current threshold value $I_{th}$ that is stored in advance in the field current threshold value storing section 141a. Next, in a case where the field current I exceeds the field current threshold value $I_{th}$, the field current restriction deciding section 142 starts measuring continuous operation time under the condition where the field current I is larger than the field current threshold value $I_{th}$.

Next, when the continuous operation time under the condition where the field current I is larger than the field current threshold value $I_{th}$ reaches the continuous operation permitted time $T_{th}$, the field current restriction deciding section 142 decides that the restriction on the field current I is necessary. Then, the field current restriction deciding section 142 sends the decision result to the field current restriction instructing section 143.

When it is decided, based on the decision result of the field current restriction deciding section 142, that the restriction on the field current I is necessary, the field current restriction instructing section 143 obtains the field current restriction value $I_{lim}$ from the field current restriction value storing section 141c and the field current restriction time $T_{lim}$ from the field current restriction time storing section 141d. Then, the field current restriction instructing section 143 sends the field current restriction value $I_{lim}$, to the field current controller 110 during the field current restriction time $T_{lim}$. Thus, the field current controller 110, which receives the field current restriction value $I_{lim}$ is capable of controlling the field current I to be the field current restriction value $I_{lim}$, to thereby prevent a failure due to a temperature rise.

Here, the field current restriction instructing section 143 stops sending the field current restriction value $I_{lim}$ to the field current controller 110 when the field current restriction time $T_{lim}$ has elapsed. In other words, the restriction on the field current I is released so that the field current I is controlled based on the field current instruction value $I_f$.

Note that the field current threshold value $I_{th}$, the continuous operation permitted time $T_{th}$, and the field current restriction time $T_{lim}$ according to Embodiment 1 of the present invention are set to values such that temperature of the dynamo-electric machine 40 falls within a temperature range that allows at least normal operation, based on a relationship between the field current I and temperature of the dynamo-electric machine 40 that are measured in advance.

As described above, the field winding type generator-motor according to Embodiment 1 restricts, based on the detection result of the field current flowing in the field winding, the field current so that temperature of the field winding type generator-motor does not rise excessively. Thus, it is possible to obtain the field winding type generator-motor capable of minimizing cost increase and structure modification while preventing a failure due to a temperature rise, without mounting a temperature sensor.

Embodiment 2.

In the above description of Embodiment 1, the field current restriction is performed when the detected field current is larger than the predetermined field current threshold value for the predetermined permitted time. In contrast, in Embodiment 2 of the present invention that is described below, the field current restriction is performed based on a time integral value of the field current value that is larger than a predetermined field current threshold value.

Figure 5:
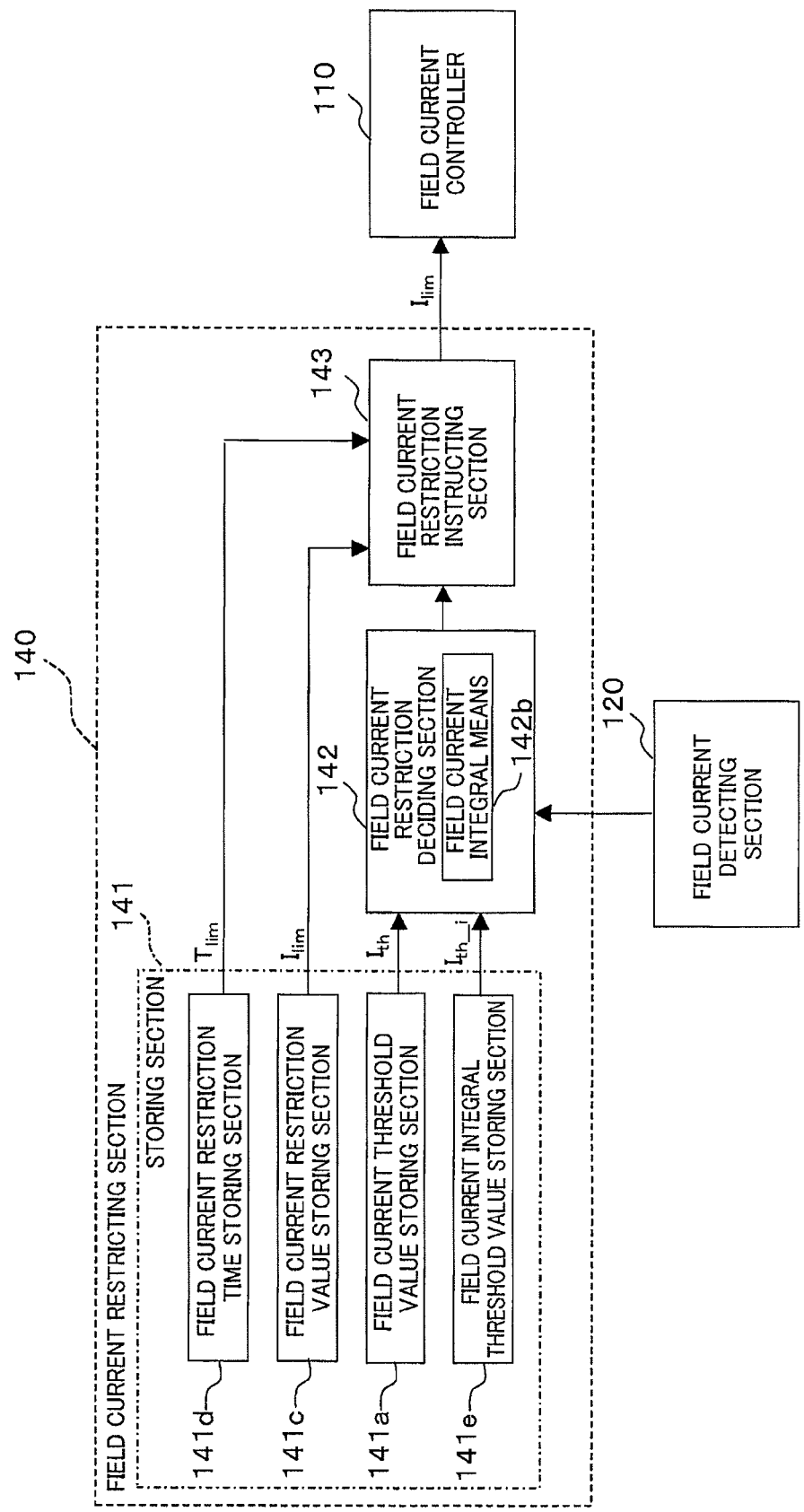
FIG. 5 is an internal block diagram of a field current restricting section according to Embodiment 2 of the present invention.

FIG. 5 is an internal block diagram of a field current restricting section 140 according to Embodiment 2 of the present invention. The field current restricting section 140 in FIG. 5 includes a storing section 141, a field current restriction deciding section 142, and a field current restriction instructing section 143.

The storing section 141 includes a field current threshold value storing section 141a, a field current restriction value storing section 141c, a field current restriction time storing section 141d, and a field current integral threshold value storing section 141e. In addition, the field current restriction deciding section 142 includes a field current integral means 142b.

Comparing the storing section 141 of the above Embodiment 1 illustrated in FIG. 3 with the storing section 141 of Embodiment 2 illustrated in FIG. 5, the storing section 141 of Embodiment 2 is different from the storing section 141 of the above Embodiment 1 in that the field current integral threshold value storing section 141e is disposed instead of the continuous operation permitted time storing section 141b. Further, comparing the field current restriction deciding section 142 of the above Embodiment 1 illustrated in FIG. 3 with the field current restriction deciding section 142 of Embodiment 2 illustrated in FIG. 5, the field current restriction deciding section 142 of Embodiment 2 includes the field current integral means 142b instead of the field current continuous operation measuring means 142a.

In Embodiment 2, in a case where the field current I is larger than the field current threshold value $I_{th}$, the field current value larger than the field current threshold value $I_{th}$ is integrated with respect to time. Then, when a time integral value thereof (hereinafter referred to as "field current integral value $I_{f-i}$") exceeds a predetermined threshold value (hereinafter referred to as "field current integral threshold value $I_{th-i}$") the restriction on the field current I is performed. Note that the rest of the structure is the same as that of Embodiment 1 described above.

The field current integral threshold value storing section 141e is connected to the field current restriction deciding section 142 and stores in advance the field current integral threshold value $I_{th-i}$.

In a case where the field current I is larger than the field current threshold value $I_{th}$, the field current integral means 142b integrates the field current value larger than the field current threshold value $I_{th}$, with respect to time. On the other hand, in a case where the field current I is equal to or smaller than the field current threshold value $I_{th}$, the field current integral means 142b clears the integral value to zero.

Figure 6:
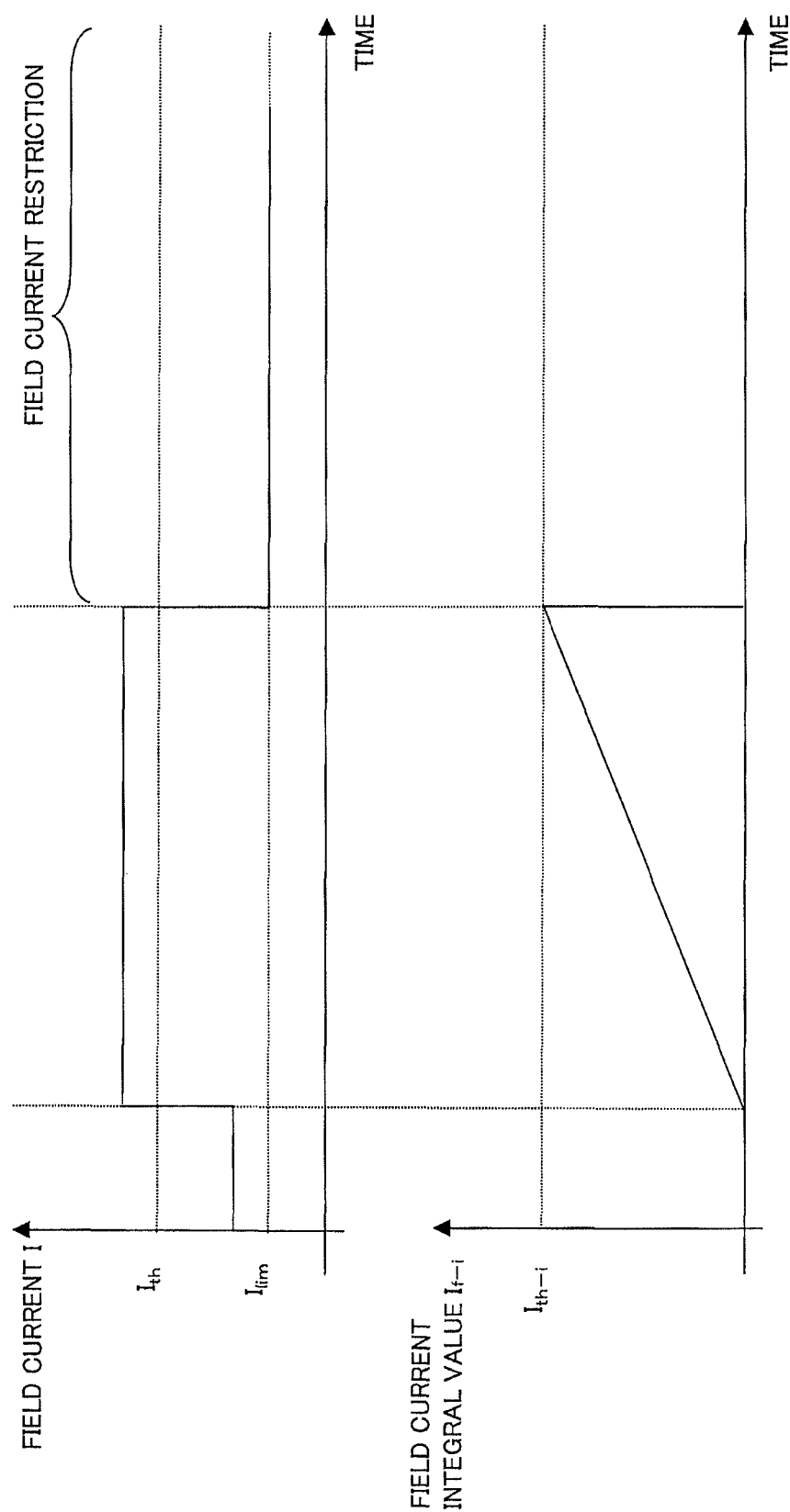
FIG. 6 is an explanatory diagram illustrating a method of deciding whether or not restriction on field current is necessary according to Embodiment 2 of the present invention.

Next, an operation of the field current restriction deciding section 142 is described with reference to FIG. 6. First, the field current restriction deciding section 142 compares the field current I detected by the field current detecting section 120, with the field current threshold value $I_{th}$ obtained from the field current threshold value storing section 141a. Next, in a case where the field current I exceeds the field current threshold value $I_{th}$, the excess portion of the field current value is integrated from the time point at which the field current I exceeds the field current threshold value $I_{th}$, to thereby calculate the field current integral value $I_{f-i}$. Next, in a case where the field current integral value $I_{f-i}$ exceeds the field current integral threshold value $I_{th-i}$, it is decided that the restriction on the field current I is necessary. Then, the field current restriction deciding section 142 sends the decision result to the field current restriction instructing section 143. Note that an operation of the field current restriction instructing section 143 is the same as in Embodiment 1 described above, and therefore description thereof is omitted.

As described above, the field winding type generator-motor of Embodiment 2 is different from that of Embodiment 1 described above in that, when the field current I exceeds the field current threshold value $I_{th}$, the excess portion of the field current value is integrated with respect to time. Then, when the field current integral value $I_{f-i}$ becomes equal to or larger than the field current integral threshold value $I_{th-i}$, it is decided that the restriction on the field current I is necessary. Thus, it is possible to change the timing for restricting the field current I in accordance with a value of the field current I, to thereby restrict the field current I at timing more appropriate than Embodiment 1 described above.

Embodiment 3.

In Embodiments 1 and 2 described above, the single field current threshold value is used for deciding whether or not the restriction on the field current is necessary. In contrast, according to Embodiment 3, a description is given of a case where two field current threshold values are used for deciding whether or not the restriction on the field current is necessary.

Figure 7:
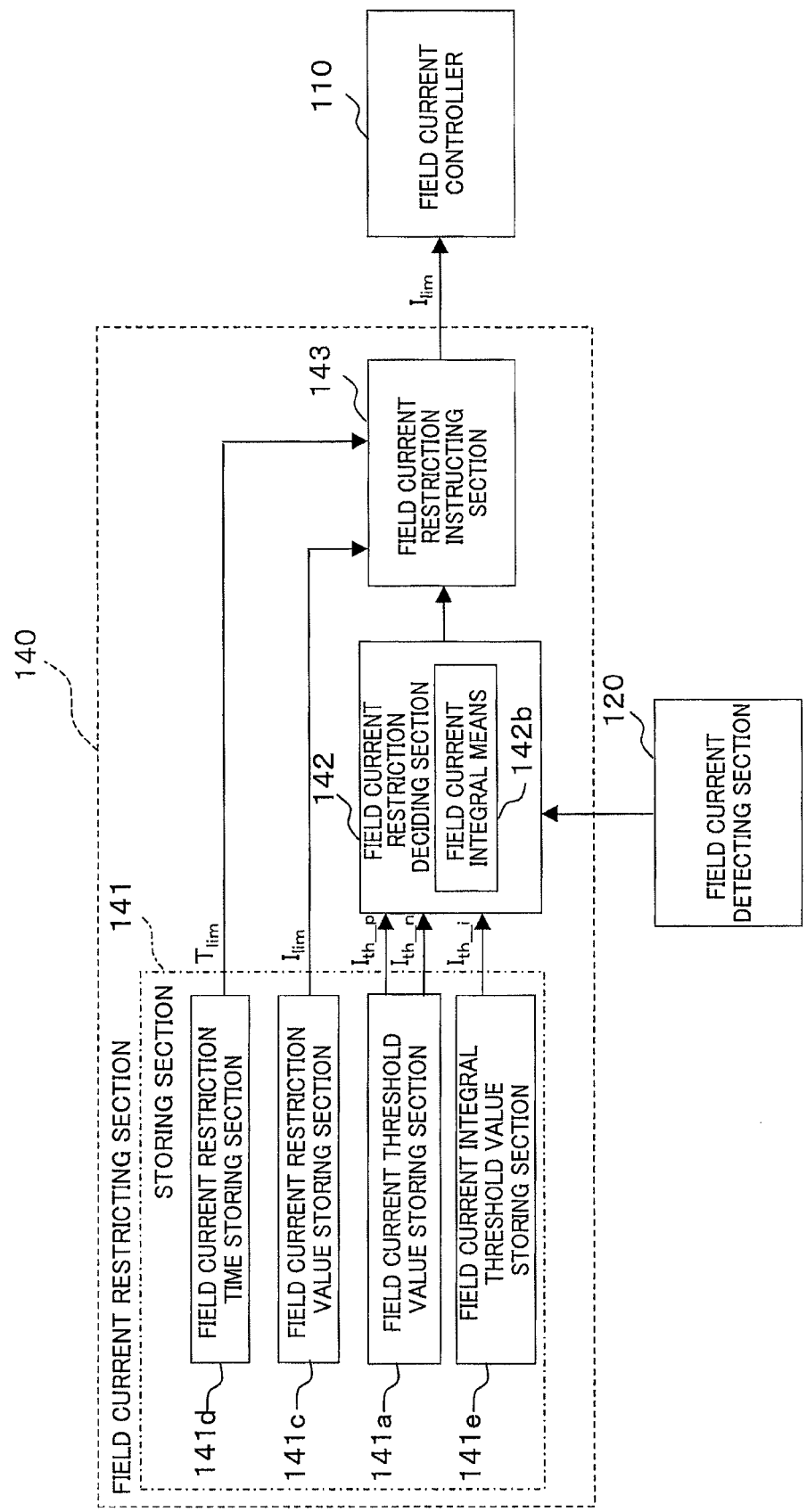
FIG. 7 is an internal block diagram of a field current restricting section according to Embodiment 3 of the present invention.

FIG. 7 is an internal block diagram of a field current restricting section 140 according to Embodiment 3 of the present invention. The field current restricting section 140 of FIG. 7 includes a storing section 141, a field current restriction deciding section 142, and a field current restriction instructing section 143.

The storing section 141 includes a field current threshold value storing section 141a, a field current restriction value storing section 141c, a field current restriction time storing section 141d, and a field current integral threshold value storing section 141e. In addition, the field current restriction deciding section 142 includes a field current integral means 142b.

The field current threshold value storing section 141a stores in advance a first field current threshold value $I_{th-p}$ and a second field current threshold value $I_{th-n}$ that is set to a value smaller than the first field current threshold value $I_{th-p}$. In other words, the first field current threshold value and the second field current threshold value have the following relationship: "first field current threshold value $I_{th\_p}$>second field current threshold value $I_{th\_n}$". Note that the rest of the structure is the same as that of Embodiment 2 described above.

Figure 8:
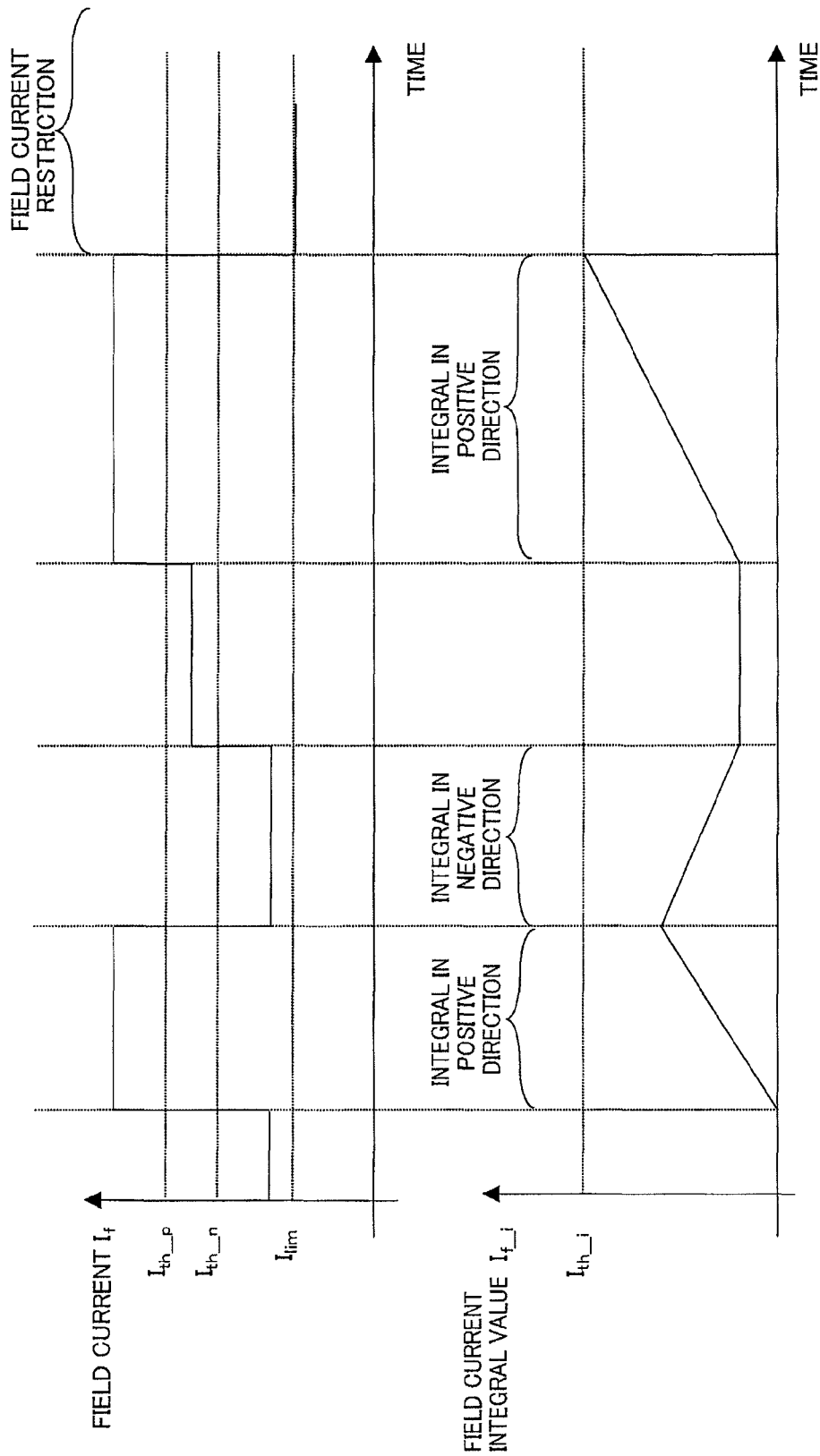
FIG. 8 is an explanatory diagram illustrating a method of deciding whether or not restriction on field current is necessary according to Embodiment 3 of the present invention.

Next, an operation of the field current restriction deciding section 142 is described with reference to FIG. 8. First, in a case where the field current I is larger than the first field current threshold value $I_{th\_p}$, the field current restriction deciding section 142 adds (integrates in the positive direction) a difference between the field current I and the first field current threshold value $I_{th\_p}$, to the field current integral value $I_{f\_i}$. On the contrary, in a case where the field current I is equal to or smaller than the second field current threshold value $I_{th\_n}$, the field current restriction deciding section 142 subtracts (integrates in the negative direction) the difference between the second field current threshold value $I_{th\_n}$ and the field current I, from the field current integral value $I_{f\_i}$. Further, in a case where the field current I is equal to or smaller than the first field current threshold value $I_{th\_p}$ and is larger than the second field current threshold value $I_{th\_n}$, the field current restriction deciding section 142 maintains the current field current integral value $I_{f\_i}$.

Next, in a case where the field current integral value $I_{f\_i}$ exceeds the field current integral threshold value $I_{th\_i}$, the field current restriction deciding section 142 decides that the restriction on the field current I is necessary. Then, the field current restriction deciding section 142 sends the decision result to the field current restriction instructing section 143. Note that an operation of the field current restriction instructing section 143 is the same as that of Embodiment 1 described above, and therefore the description thereof is omitted.

Here, the second field current threshold value $I_{th\_n}$ is set to a value such that temperature of the dynamo-electric machine 40 falls within a normal operating range even when the field winding type generator-motor performs continuous operation. In addition, the field current restriction value $I_{lim}$, in this case is set to a value equal to or smaller than the second field current threshold value $I_{th\_n}$ (see FIG. 8). Thus, the temperature of the dynamo-electric machine 40 can be more securely lowered to a value which falls within a normal operating range.

As described above, the field winding type generator-motor according to Embodiment 3 uses two field current threshold values for updating the integral value by increasing, maintaining, or decreasing the same. Thus, the restriction on the field current I can be performed at a more appropriate timing even when the field current I does not continuously exceeds the first field current threshold value $I_{th\_p}$.

Note that, according to Embodiment 2 described above, a description is given of a case where the integral value for decision is cleared to zero when the field current I becomes equal to or smaller than the field current threshold value $I_{th}$, but the present invention is not limited thereto. It is possible to adopt another structure in which the integral value is decreased when the field current I becomes equal to or smaller than the field current threshold value $I_{th}$ in the same manner as Embodiment 3, even in the case where the single field current threshold value is used as in Embodiment 2.

In addition, it is possible to adopt the two field current threshold values described in Embodiment 3 to Embodiment 1. That is, it is possible to decide whether or not the field current restriction is necessary by using a first maximum permitted time during which a state where the field current detected by the field current detecting section is larger than the first field current threshold value continues and a second maximum permitted time during which a state where the field current is larger than the second field current threshold value continues.

What is claimed is:

1. A field winding type generator-motor, comprising:
   a dynamo-electric machine which has a field winding and operates as a generator-motor;
   a field current detecting section for detecting field current flowing in the field winding;
   a field current restriction deciding section for deciding whether or not the decision value has reached a predetermined decision threshold value by calculating a decision value based on the field current detected by the field current detecting section; and
   a field current controller for controlling the field current flowing in the field winding so that the field current is restricted to a predetermined permissible value in a case where the field current restriction deciding section decides that the decision value has reached the predetermined decision threshold value.

2. A field winding type generator-motor according to claim 1, wherein:
   the field current restriction deciding section includes a field current continuous operation measuring means for calculating, as the decision value, a time in which a state where the field current detected by the field current detecting section is larger than the predetermined field current threshold value continues, so that the decision is made by using, as the predetermined decision threshold value, a permissible maximum time in which the state continues; and
   the field current controller controls the field current flowing in the field winding using the predetermined permissible value that is a field current value smaller than the predetermined field current threshold value.

3. A field winding type generator-motor according to claim 1, wherein:
   the field current restriction deciding section includes a field current integral means for calculating, as the decision value, an integral value for decision obtained by integrating a field current value that is larger than a predetermined field current threshold value with respect to time during a time period in which the state where the field current detected by the field current detecting section is larger than the predetermined field current threshold value continues, so that the decision is made by using, as the predetermined decision threshold value, a permissible maximum value of the integral value for decision; and
   the field current controller controls the field current flowing in the field winding by using, as the predetermined permissible value, a field current value smaller than the predetermined field current threshold value.

4. A field winding type generator-motor according to claim 3, wherein the field current integral means clears the integral value for decision to zero in a case where the field current detected by the field current detecting section is equal to or smaller than the predetermined field current threshold value.

5. A field winding type generator-motor according to claim 3, wherein the field current integral means calculates a subtraction integral value by integrating a field current value which is equal to or smaller than the predetermined field current threshold value with respect to time during a time period in which a state where the field current detected by the field current detecting section is equal to or smaller than the predetermined field current threshold value continues, and updates the integral value for decision by subtracting the subtraction integral value from the integral value for decision calculated as the decision value.

6. A field winding type generator-motor according to claim 3, wherein:

the field current integral means uses a second predetermined field current threshold value that is smaller than the predetermined field current threshold value for maintaining the integral value for decision, during a time period in which a state where the field current detected by the field current detecting section is equal to or smaller than the predetermined field current threshold value and is larger than the second predetermined field current threshold value continues, for calculating a subtraction integral value by integrating, with respect to time, a field current value that is equal to or smaller than the second predetermined field current threshold value during a time period in which a state where the field current detected by the field current detecting section is equal to or smaller than the second predetermined field current threshold value continues, and for updating the integral value for decision by subtracting the subtraction integral value from the integral value for decision calculated as the decision value; and the field current controller controls the field current flowing in the field winding using, as the predetermined permissible value, a field current value smaller than the second predetermined field current threshold value.

* * * * *